US010568010B2

United States Patent
Li et al.

(10) Patent No.: US 10,568,010 B2
(45) Date of Patent: Feb. 18, 2020

(54) TECHNIQUES TO SUPPORT ULTRA-RELIABLE HANDOVER IN WIRELESS NETWORKS

(71) Applicant: NOKIA SOLUTIONS AND NETWORKS OY, Espoo (FI)

(72) Inventors: Zexian Li, Espoo (FI); Mikko Saily, Laukkoski (FI); Amaanat Ali, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/096,137

(22) PCT Filed: May 12, 2016

(86) PCT No.: PCT/EP2016/060696
§ 371 (c)(1),
(2) Date: Oct. 25, 2018

(87) PCT Pub. No.: WO2017/194121
PCT Pub. Date: Nov. 16, 2017

(65) Prior Publication Data
US 2019/0141590 A1    May 9, 2019

(51) Int. Cl.
*H04W 4/00* (2018.01)
*H04W 36/02* (2009.01)
(Continued)

(52) U.S. Cl.
CPC .......... *H04W 36/023* (2013.01); *H04B 1/711* (2013.01); *H04B 17/336* (2015.01);
(Continued)

(58) Field of Classification Search
CPC .......... H04W 36/023; H04W 56/0045; H04W 52/245; H04W 24/10; H04B 17/336; H04B 1/711
(Continued)

(56) References Cited

U.S. PATENT DOCUMENTS

| 5,920,817 A | 7/1999 | Umeda et al. |
| 9,629,133 B2 * | 4/2017 | Rosa ............... H04L 1/0026 |

(Continued)

FOREIGN PATENT DOCUMENTS

| EP | 2448340 A1 | 5/2012 |
| WO | 2015020576 A1 | 2/2015 |
| WO | 2015020581 A1 | 2/2015 |

OTHER PUBLICATIONS

International Search Report and Written Opinion for PCT Application PCT/EP2016/060696, dated Jan. 11, 2017, 17 pages.
(Continued)

*Primary Examiner* — Thai D Hoang
(74) *Attorney, Agent, or Firm* — Brake Hughes Bellermann LLP

(57) ABSTRACT

A technique may include receiving, by a user device in a wireless network, an indication of a set of uplink time-frequency resources to be used for an uplink transmission from the user device to both a master cell and a slave cell, determining, by the user device, a timing advance associated with the master cell, and performing a single transmission, by the user device, of a block of data to both of the master cell and the slave cell via the set of uplink time-frequency resources using the timing advance associated with the master cell.

20 Claims, 8 Drawing Sheets

(51) Int. Cl.
  *H04W 36/18* (2009.01)
  *H04W 56/00* (2009.01)
  *H04B 17/336* (2015.01)
  *H04B 1/711* (2011.01)
  *H04W 24/10* (2009.01)
  *H04W 52/24* (2009.01)

(52) U.S. Cl.
  CPC .......... *H04W 24/10* (2013.01); *H04W 36/18* (2013.01); *H04W 52/245* (2013.01); *H04W 56/0045* (2013.01)

(58) Field of Classification Search
  USPC ....... 370/331–334; 455/432.1–433, 436–444
  See application file for complete search history.

(56) References Cited

U.S. PATENT DOCUMENTS

| | | | |
|---|---|---|---|
| 2013/0176953 | A1 | 7/2013 | Stern-Berkowitz et al. |
| 2013/0250925 | A1* | 9/2013 | Lohr ................. H04W 72/0446 370/336 |
| 2015/0173097 | A1 | 6/2015 | Balachandran et al. |
| 2015/0271723 | A1 | 9/2015 | Yang et al. |
| 2015/0327198 | A1* | 11/2015 | Axmon ............. H04W 56/0045 370/336 |
| 2019/0199420 | A1* | 6/2019 | Faxer ................... H04L 5/0057 |
| 2019/0261193 | A1* | 8/2019 | Torsner ..................... G06T 7/20 |
| 2019/0261407 | A1* | 8/2019 | Irukulapati ........... H04W 72/14 |

OTHER PUBLICATIONS

Falconetti et al.; Uplink Coordinated Multi-Point Reception in LTE Heterogeneous Networks; 8th International Symposium on Wireless Communication Systems; Nov. 6-9, 2011; Aachen, Germany; pp. 764-768.

Barbera et al.; Synchronized RACH-less Handover Solution for LTE Heterogeneous Networks; International Symposium on Wireless Communication Systems (ISWCS); Aug. 25-28, 2015; Brussels, Belgium; 6 pages.

Hoymann et al.; Distributed Uplink Signal Processing of Cooperating Base Stations based on IQ Sample Exchange; IEEE International Conference on Communications; Jun. 14-18, 2009; Dresden, Germany; 5 pages.

3GPP TR 22.891 V14.0.0; 3rd Generation Partnership Project; Technical Specification Group Services and System Aspects; Feasibility Study on New Services and Markets Technology Enablers; Stage 1 (Release 14); Mar. 2016; Sophia Antipolis, France; 95 pages.

3GPP TS 25331 V13.2.0; 3rd Generation Partnership Project; Technical Specification Group Radio Access Network; Radio Resource Control (RRC); Protocol specification (Release 13); Mar. 2016; Sophia Antipolis, France; 2269 pages.

Office Action for European Application No. 16722222.3, dated Oct. 23, 2019, 9 pages.

* cited by examiner

TECHNIQUES TO SUPPORT ULTRA-RELIABLE HANDOVER IN WIRELESS NETWORKS

CROSS-REFERENCE TO RELATED APPLICATIONS

This application is a national stage entry of PCT Application No. PCT/EP2016/060696 filed May 12, 2016, entitled "TECHNIQUES TO SUPPORT ULTRA-RELIABLE HANDOVER IN WIRELESS NETWORKS" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G wireless networks are also being developed. 5G wireless networks may provide improved performance in a number of areas. For example, at least in some cases, 5G wireless networks may provide ultra-reliable and low-latency communication (URLLC) so as to meet the demands of one or more applications, e.g., which may require shorter end-to-end latency and a higher degree of reliability. There are many new use cases that may benefit from this improved performance, such as, for example, autonomous (or self-driving) vehicles. As an illustrative example, in order to provide ultra-reliable communication, handover processes should also provide improved reliability and/or decreased rate of service interruption.

SUMMARY

According to an example implementation, a method may include determining, by a slave cell, a set of buffer gap resources that are adjacent to a set of uplink resources to be used for an uplink transmission from a user device to both a master cell and the slave cell, the set of buffer gap resources being based on a difference between a first propagation delay between the user device and the master cell and a second propagation delay between the user device and the slave cell; and reserving, by the slave cell, both the set of uplink resources for uplink transmission and the adjacent set of buffer gap resources, to accommodate an uplink transmission from the user device based on a timing advance associated with the master cell.

According to another example implementation, an apparatus may include at least one processor and at least one memory including computer instructions, when executed by the at least one processor, cause the apparatus to: determine, by the slave cell, a set of buffer gap resources that are adjacent to the set of uplink resources to be used for an uplink transmission from a user device to both a master cell and the slave cell, the set of buffer gap resources being based on a difference between a first propagation delay between the user device and the master cell and a second propagation delay between the user device and the slave cell; and reserve, by the slave cell, both the set of uplink resources for uplink transmission and the adjacent set of buffer gap resources, to accommodate an uplink transmission from the user device based on a timing advance associated with the master cell.

According to another example implementation, a computer program product may include a computer-readable storage medium and storing executable code that, when executed by at least one data processing apparatus, is configured to cause the at least one data processing apparatus to perform a method including determining, by the slave cell, a set of buffer gap resources that are adjacent to a set of uplink resources to be used for an uplink transmission from a user device to both a master cell and the slave cell, the set of buffer gap resources being based on a difference between a first propagation delay between the user device and the master cell and a second propagation delay between the user device and the slave cell; and reserving, by the slave cell, both the set of uplink resources for uplink transmission and the adjacent set of buffer gap resources, to accommodate an uplink transmission from the user device based on a timing advance associated with the master cell.

According to another example implementation, an apparatus may include means for determining, by a slave cell, a set of buffer gap resources that are adjacent to a set of uplink resources to be used for an uplink transmission from a user device to both a master cell and the slave cell, the set of buffer gap resources being based on a difference between a first propagation delay between the user device and the master cell and a second propagation delay between the user device and the slave cell; and means for reserving, by the slave cell, both the set of uplink resources for uplink transmission and the adjacent set of buffer gap resources, to accommodate an uplink transmission from the user device based on a timing advance associated with the master cell.

According to an example implementation, a method may include: receiving, by the user device in a wireless network, an indication of a set of uplink time-frequency resources to be used for an uplink transmission from the user device to both a master cell and a slave cell; determining, by the user device, a timing advance associated with the master cell; and, performing a single transmission, by the user device, of a block of data to both of the master cell and the slave cell via the set of uplink time-frequency resources using the timing advance associated with the master cell.

According to another example implementation, an apparatus may include at least one processor and at least one memory including computer instructions, when executed by the at least one processor, cause the apparatus to: receive, by the user device in a wireless network, an indication of a set of uplink time-frequency resources to be used for an uplink transmission from the user device to both a master cell and a slave cell; determine, by the user device, a timing advance associated with the master cell; and, perform a single transmission, by the user device, of a block of data to both of the master cell and the slave cell via the set of uplink time-frequency resources using the timing advance associated with the master cell.

According to another example implementation, a computer program product may include a computer-readable storage medium and storing executable code that, when executed by at least one data processing apparatus, is configured to cause the at least one data processing apparatus to perform a method including receiving, by the user device in a wireless network, an indication of a set of uplink time-frequency resources to be used for an uplink transmission from the user device to both a master cell and a slave cell; determining, by the user device, a timing advance associated with the master cell; and, performing a single transmission, by the user device, of a block of data to both of the master cell and the slave cell via the set of uplink time-frequency resources using the timing advance associated with the master cell.

According to another example implementation, an apparatus may include means for receiving, by the user device in a wireless network, an indication of a set of uplink time-frequency resources to be used for an uplink transmission from the user device to both a master cell and a slave cell; means for determining, by the user device, a timing advance associated with the master cell; and, means for performing a single transmission, by the user device, of a block of data to both of the master cell and the slave cell via the set of uplink time-frequency resources using the timing advance associated with the master cell.

According to an example implementation, a method may include determining, by a user device in a wireless network, a first timing advance associated with the source cell; performing, by the user device prior to the user device determining a second timing advance associated with the target cell, a first single data transmission to both the source cell and the target cell via a first set of uplink time-frequency resources using the first timing advance associated with the source cell; determining, by the user device, a second timing advance associated with the target cell; and performing, by the user device after the user device determines the second timing advance associated with the target cell, a second single data transmission to both the source cell and the target cell via a second set of uplink time-frequency resources using the second timing advance associated with the target cell.

According to another example implementation, an apparatus may include at least one processor and at least one memory including computer instructions, when executed by the at least one processor, cause the apparatus to: determine, by a user device in a wireless network, a first timing advance associated with the source cell; perform, by the user device prior to the user device determining a second timing advance associated with the target cell, a first single data transmission to both the source cell and the target cell via a first set of uplink time-frequency resources using the first timing advance associated with the source cell; determine, by the user device, a second timing advance associated with the target cell; and perform, by the user device after the user device determines the second timing advance associated with the target cell, a second single data transmission to both the source cell and the target cell via a second set of uplink time-frequency resources using the second timing advance associated with the target cell.

According to another example implementation, a computer program product may include a computer-readable storage medium and storing executable code that, when executed by at least one data processing apparatus, is configured to cause the at least one data processing apparatus to perform a method including determining, by a user device in a wireless network, a first timing advance associated with the source cell; performing, by the user device prior to the user device determining a second timing advance associated with the target cell, a first single data transmission to both the source cell and the target cell via a first set of uplink time-frequency resources using the first timing advance associated with the source cell; determining, by the user device, a second timing advance associated with the target cell; and performing, by the user device after the user device determines the second timing advance associated with the target cell, a second single data transmission to both the source cell and the target cell via a second set of uplink time-frequency resources using the second timing advance associated with the target cell.

According to another example implementation, an apparatus may include means for determining, by a user device in a wireless network, a first timing advance associated with the source cell; means for performing, by the user device prior to the user device determining a second timing advance associated with the target cell, a first single data transmission to both the source cell and the target cell via a first set of uplink time-frequency resources using the first timing advance associated with the source cell; means for determining, by the user device, a second timing advance associated with the target cell; and means for performing, by the user device after the user device determines the second timing advance associated with the target cell, a second single data transmission to both the source cell and the target cell via a second set of uplink time-frequency resources using the second timing advance associated with the target cell.

The details of one or more examples of implementations are set forth in the accompanying drawings and the description below. Other features will be apparent from the description and drawings, and from the claims.

DETAILED DESCRIPTION

Figure 1:
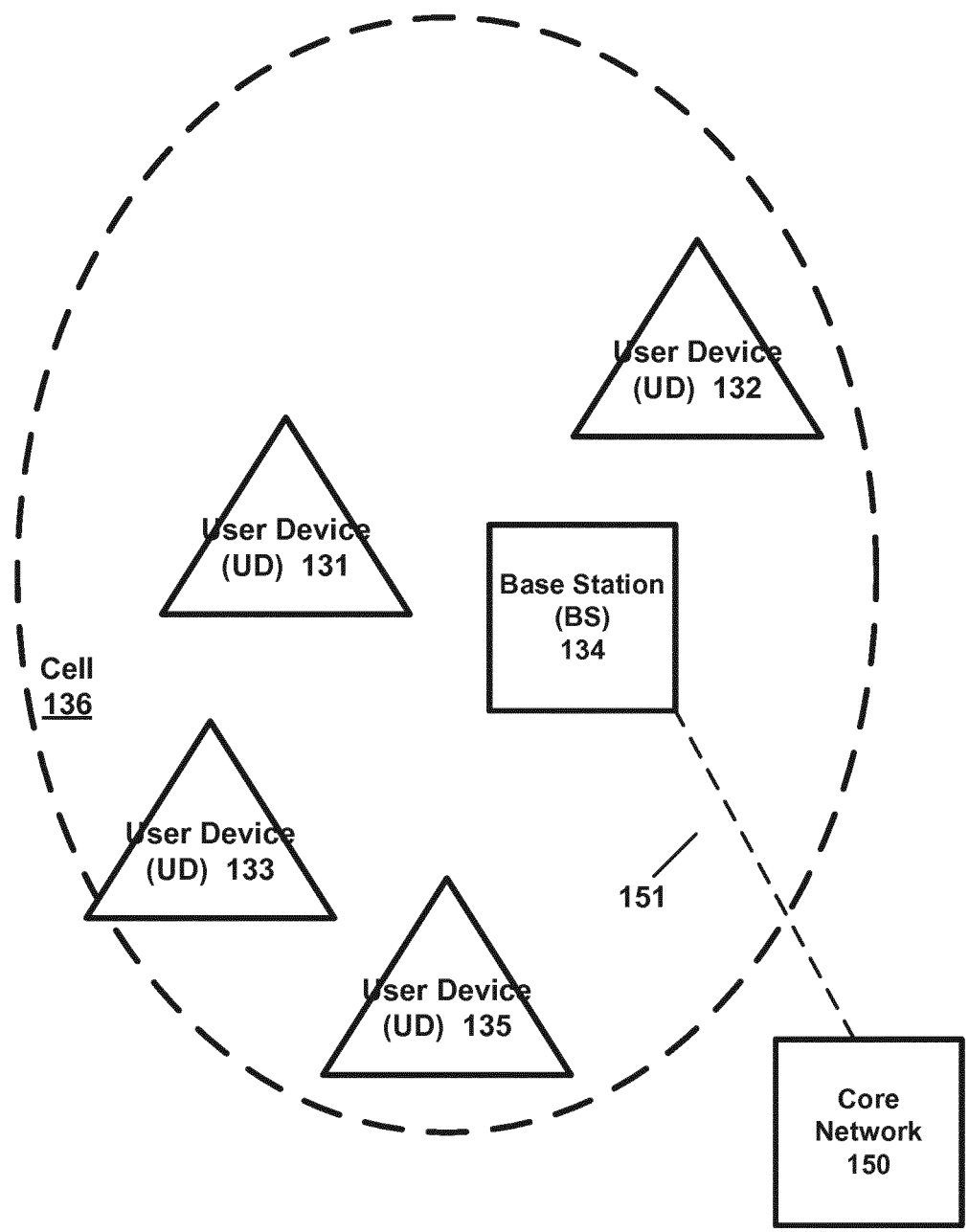
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an Access Point (AP) or an enhanced Node B (eNB). At least part of the functionalities of a base station (BS), access point (AP) or (e)Node B (eNB) may be also be carried out by any node, server or host which may be operably coupled to a transceiver, such as a remote radio head. BS 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (or user terminal, or user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network. A user device may also be referred to herein as a user equipment (UE).

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network.

In some wireless/radio technologies, such as Long Term Evolution (LTE), as an illustrative example, the start time for uplink (UL) transmission for each user device is adjusted by a Timing Advance (TA) command (which identifies a timing advance offset, which may be referred to herein as a timing advance) according to the user device's/UE's distance from the BS (or according to a UE-BS/cell propagation delay). The aim is, for example, to align at the BS/cell the signals received from the multiple user devices/UEs despite the different propagation delays for each UE, since each user device in a cell/network may be located a different distance from the BS. Thus, each user device may have a different propagation delay to a cell/BS. The timing advance offset (or simply timing advance) may indicate a time period in front of or before the uplink (UL) scheduled slot (e.g., UL subframe or scheduled UL transmission period) that the user device should begin its UL transmission, so that all received UL data at the BS will be aligned (or received at the BS/cell at approximately the same time, e.g., to avoid interference at the BS).

Various example implementations are described that improve the reliability of communications, and in particular, are designed to improve the reliability of handovers of a user device from a source cell to a target cell. In order to improve communications and/or to improve reliability of handovers, one or more of the following features may be provided:

1) Multi-Connectivity between a user device and multiple cells. In some cases, multi-connectivity may be provided between the user device and multiple cells, where communication may be performed between the user device and multiple cells/BSs.

2) Multi-cell communication between a user device and multiple cells/BSs, in the uplink (UL) and/or downlink (DL) directions. This may include, for example, a user device transmitting UL data to multiple cells via a single transmission and via a single set of time-frequency resources that are reserved by the multiple cells for the user device. In this manner, the UE may transmit a data block once, which is received by multiple cells. This may provide improved reliability and latency performance for UL communications, while avoiding the user device transmitting the data separately to each cell/BS. In the DL direction, the core network may forward DL data to the user device via multiple cells (e.g., the same data may be sent via both a first cell and via a second cell), e.g., to improve reliability of DL communications. For example, a user device may transmit UL data to both a first cell (e.g., a source cell) and a second cell (e.g., a target cell) during a handover of the user device from the first cell to the second cell to improve reliability of the handover, without requiring the user device to transmit duplicate data to each of the multiple cells (multiple data transmissions) separately. The UL data transmission, transmitted by the user device via a single transmission to multiple cells, may be transmitted with a timing advance (also known as timing advance offset) associated with one cell (e.g., a master cell) of the multiple cells for which the user device has the timing advance. Each of the multiple cells (the master cell and the other cells, which may be referred to as slave cells) may reserve the UL resources (same set of time-frequency resources) for the user device to perform the UL transmission. The remaining (e.g., slave) cells (where the timing advance used to transmit the data is not based on the propagation delay of such remaining cells) may also reserve buffer gap resources that may be adjacent (in time) to the UL resources allocated for the UL transmission. Thus, according to an example implementation, the slave cell(s) may reserve buffer gap resources, which may include the same frequency resources as the UL resources reserved for the UL transmission, where the buffer gap resources may be provided adjacent (in time) to the UL resources reserved for UL transmission. Other buffer gap resources may be reserved. At each of the slave cell(s), the reserved buffer gap resources may accommodate the UL transmission from the user device that may have been transmitted with a timing advance (or timing advance offset) for a cell that has a different propagation delay to the user device, e.g., to avoid interference at each of the slave cells from other user devices.

For example, a master cell may be considered the cell for which the user device has or knows the timing advance, and then the user device transmits the data (via a single transmission) to the multiple cells (to the master cell and one or more slave cells) based on the timing advance for the master cell. The slave cells may be any cells involved in (or receiving) a multiple cell UL transmission that are not the master cell. For example, a slave cell may be a cell for which the user device does not have a timing advance, and/or a cell for which the UL multi-cell transmission is performed by the user device based on a timing advance that does not match (or is not based on) the propagation delay for the slave cell. For example, the UL data transmitted to multiple cells may be sent with the timing advance for the master cell, which may generally be different than the timing advance of the slave cells, due to a different propagation delay for each user device-cell link).

3) According to an example implementation, in determining a target cell for a handover from a source cell, the user device may select (or may prioritize for handover) a cell(s) that is of the same type (or the same size) as the source cell. Different cell sizes/types may include, by way of example, a small cell, a medium cell, and a large cell, or (in increasing size) a pico cell, a micro cell and a macro cell. In at least some cases, for two cells, the distance or propagation delay between a cell and a user device may be more similar for cells that are of the same type or the same size. On the other hand, cells that are of different sizes or a different cell types may be more likely to have a larger difference in the user device-cell link propagation delay. Therefore, according to an example implementation, an advantage of selecting (or prioritizing) a cell for handover that is the same type (or the same size) as the source cell is this may reduce the amount of buffer gap resources to be reserved by one or more slave cells to avoid interference at the slave cell from other user devices. According to an example implementation, the amount of buffer gap resources allocated/reserved by a slave cell may be based upon a difference between a first propagation delay (or distance) between a user device and a master cell and a second propagation delay (or distance) between the user device and the slave cell. Thus, for example, the larger the different in distance/propagation delay between the master cell and slave cell (with respect to the user device), the larger or greater the amount of buffer gap resources may typically be reserved at the slave cell.

4) Control messages/information may be sent (or exchanged) between BSs/cells (e.g., via a BS-to-BS interface) that may communicate (or negotiate) the UL resources to be used by the user device for a single UL transmission to multiple cells, the buffer gap resources to be reserved by a slave cell, and/or power control information (e.g., a power control command and/or a signal strength, such as signal to interference plus noise ratio (SINR) of one or more links). In an example implementation, the power control information may include, for example, the master cell providing power control information based on a weakest link between the user device-master cell link and the user device-slave cell link(s) (e.g., a power control command or a SINR of the weakest link). In an example implementation, the user device may then, for example, adjust its transmission power based on this weakest link so as to provide sufficient power for the transmitted data to reach both the master cell and the slave cell. Also, according to an example implementation, a single timing advance may be used for an UL transmission from a user device to multiple cells, and a single (or common) power control information (e.g., power control command or weakest link information) may be sent by one of multiple cells (e.g., a master cell) to the user device to control the transmission power of the single UL transmission to multiple cells. In an example implementation, the phrase single UL transmission may refer to the user device transmitting a data block once (e.g., via a same set of UL time-frequency resources reserved by each cell), and where this data block may be received by multiple cells (as opposed to separately transmitting the block of data to each of the cells). As noted, slave cells may also reserve buffer gap resources to avoid interference with other user device transmissions at the slave cell, e.g., based on a difference in link propagation delays (or distances) between the user device-master cell link and user device-slave cell link (e.g., where the data is transmitted based on a timing advance with respect to the master cell).

Figure 2:
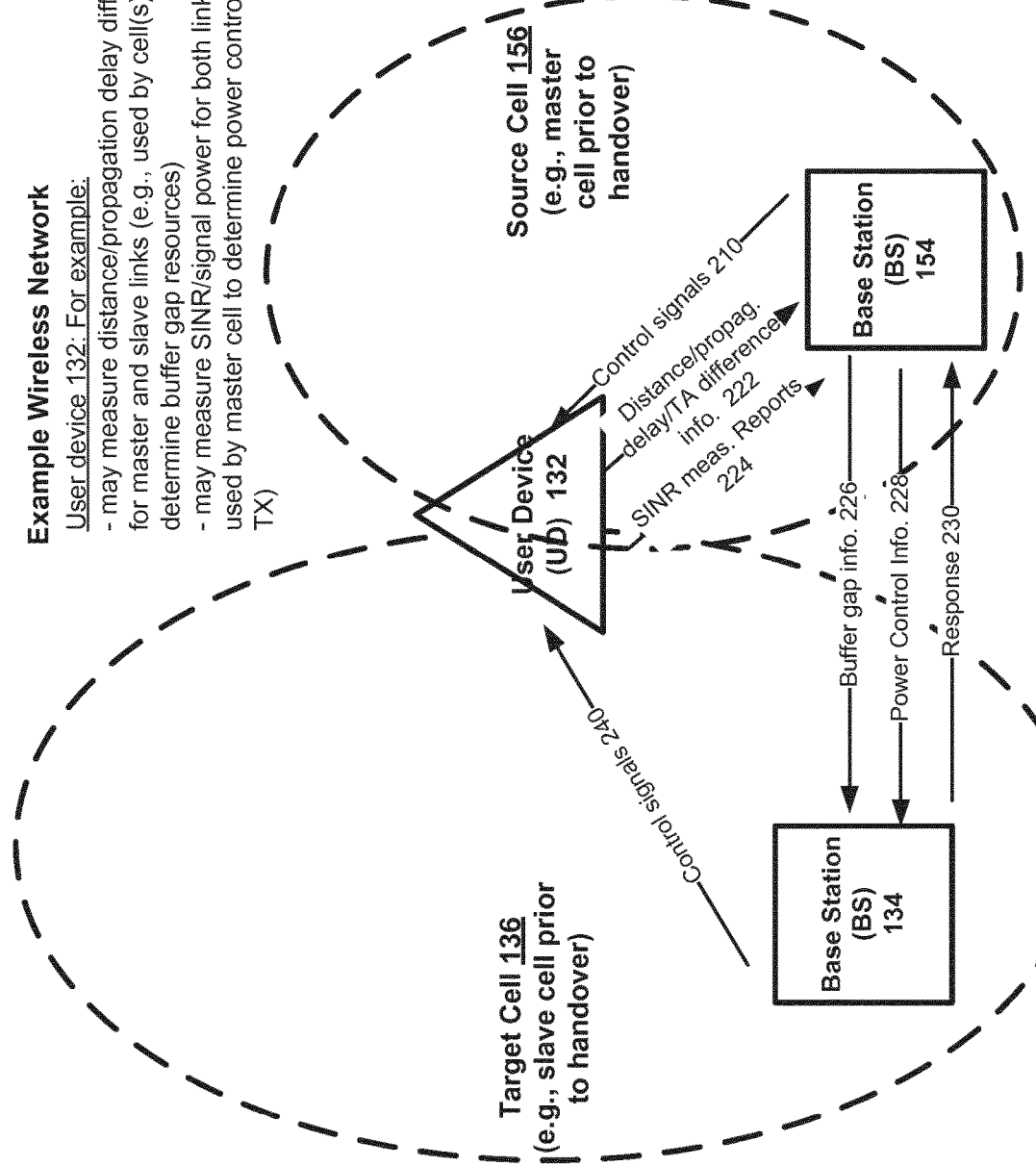
FIG. 2 is a diagram of a wireless network illustrating a handover of a user device according to an example implementation.

FIG. 2 is a diagram of a wireless network illustrating a handover of a user device according to an example implementation. BS 134 provides wireless services within cell 136, and BS 154 provides wireless services within cell 156. In this illustrative example, the user device 132 may be moving, for example, right to left (away from cell 156, and towards cell 136), for example. Therefore, in this example, cell 156 may be the source cell and cell 136 may be the target cell for handover of user device 132. Therefore, a handover may be performed for user device 132 from source cell 156 to target cell 136. However, as part of multi-connectivity, or multi-cell communication, user device 132 may be in communication (e.g., in one or both of UL and DL) with both cells 156 and 136 both before and after the handover, for example.

Figure 3:
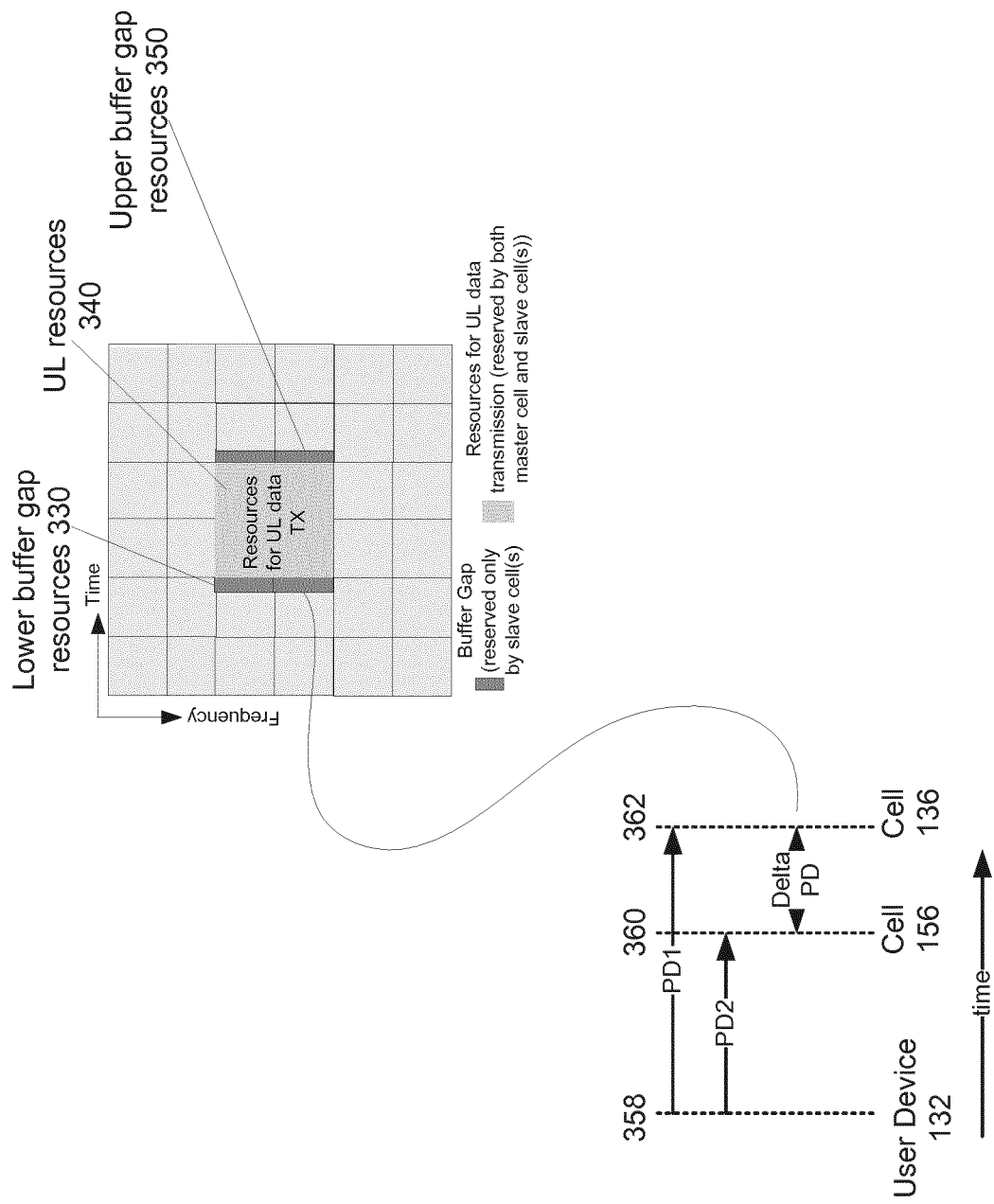
FIG. 3 is a diagram illustrating resources allocated for uplink data transmission according to an example implementation.

FIG. 3 is a diagram illustrating resources allocated for uplink data transmission according to an example implementation. According to an example implementation, a single UL data transmission may mean that a block of data is transmitted once via a set of resources and received by both source cell 156 and target cell 136 (as opposed to separately transmitting the block of data to each cell). Thus, the transmission of a data block to multiple cells (at the same time, using a single data transmission) via a set of UL resources is more efficient than the user device 132 separately transmitting the same data to each cell. However, to accomplish such a single transmission to multiple cells at a time, the resources should be coordinated or negotiated among those cells. And, any discrepancy in timing advance or difference in propagation delay among the multiple cells should be identified or estimated, and buffer gap resources may be reserved at each slave cell (e.g., which may be, for example, the target cell before handover, and the source cell after handover) to account for differences in timing advance or propagation delay between the master cell and the slave cells, with respect to the user device 132.

Both the source cell and the target cell may reserve UL resources 340 for user device 132 to perform a single UL data transmission from the user device 132 to both source cell 156 and target cell 136. For example, source cell 156 (e.g., acting as the master cell initially, prior to handover) may assign UL resources 340 for user device 132 and then may send a message to target cell 136 (acting initially as a slave cell, prior to handover) indicating the UL resources 340 reserved for user device 132 for UL data transmission, and target cell 136 may confirm or acknowledge that those UL resources have also been reserved by target cell 136 for user device 132.

Cells/BSs may be located at different locations, and at different distances to user device 132. For example, as shown in FIG. 2, user device 132 is closer to cell 156/BS 154 than cell 136/BS 134. Thus, in this example, the distance and/or propagation delay (PD2) of the user device-source cell 156 link is less than the distance and propagation delay (PD1) of the user device-target cell 136 link. As shown in FIG. 3, a propagation delay (PD1) is shown from user device 132 to source cell 156, and a propagation delay (PD2) is shown from user device 132 to target cell 136. According to an example implementation, because the source cell 156 is the master cell before handover (in this illustrative example), this data transmission performed by user device 132 before handover may be based on a timing advance for source cell 156.

Referring to FIGS. 2 and 3, in this example, the data transmitted from user device 132 at transmission point 358 is received by cell 156 at reception point 360, and is received by cell 136 at reception point 362 (where reception point 362 is later in time than reception point 360 based on the PD1 being greater than PD2). However, according to an example implementation, because the UL resources 340 allocated/reserved (by both cells 156 and 136) to user device 132 for this UL data transmission are based (at least in this example) on the timing advance for source cell 156 and the reception point 360 for source cell 156, target cell 136 (as a slave cell) may receive data of the UL data transmission after the end of the reserved UL resources 340. Thus, in some cases, the late arrival, as received by cell 136, of at least some of the transmitted data may interfere with other data transmissions from other user devices, as received by target cell 136. Thus, to avoid such an interference at cell 136, the cell 136 (as a slave cell) may reserve a set of buffer gap resources 330 and/or 350 to accommodate a transmission of data to multiple cells based on a timing advance for another cell that has a different propagation delay/distance/timing advance as compared to the (slave) cell 136.

According to an example implementation, the set of buffer gap resources may include a lower buffer gap resources 330 and/or an upper buffer gap resources. According to an example implementation, the upper buffer gap resources 350 may protect a cell against interference by allocating/reserving resources adjacent to and immediately after (in time) to the resources 340 allocated for UL transmission allocated by both cells 136 and 156. According to an example implementation, the lower buffer gap resources 330 may protect a cell against interference by allocating/reserving resources adjacent to and immediately before (in time) to the resources 340 allocated/reserved for the UL transmission by both cells 136 and 156. Any cell may reserve buffer gap resources. According to an illustrative example implementation, buffer gap resources may be reserved by slave cells, and are not needed nor necessarily reserved by a master cell.

For example, the upper buffer gap resources 350 may act to protect a slave cell where the distance/propagation delay of the user device-slave cell link is greater than the distance/propagation delay of the user device-master cell link (such as the example shown in FIGS. 2-3). On the other hand, the lower buffer gap resources 330 may act to protect a slave cell where the distance/propagation delay of the user device-slave cell link is less than the distance/propagation delay of the user device-master cell link. In some cases, a slave cell may reserve one or both of the lower buffer gap resources 330 and the upper buffer gap resources. The amount of resources (or length in time of such upper or lower buffer gap resources) may be based on a difference in the propagation delay, e.g., PD1-PD2, shown in FIG. 3 as delta PD. If delta PD is greater, then a greater amount of buffer gap resources 330/350 may typically be needed and/or reserved by the slave cell. Hence, it may be advantageous for the user device 132 to select a target cell for handover that is the same type of cell as the source cell, e.g., such that it is more likely that the distances/propagation delays for the two cells with respect to the user device are more similar (smaller difference between the distances/propagation delays, as compared to if a target cell is selected that is a different cell type).

According to an example implementation, prior to the handover of the user device to the target cell 136, the user device 132 may have and use for UL transmission the timing advance for the source cell 156. Hence, in this illustrative example, the source cell 156 would be the master cell and the other cells (e.g., including the target cell 136) would be slave cells. As noted, each of the slave cells may typically reserve/allocate buffer gap resources based on the difference in distance/propagation delay of the user device-master cell link and the user device-slave cell link. Either the master cell or the slave cell may determine the buffer gap resources, or the master cell and slave cell may negotiate the buffer gap resources. The allocation/reserving of buffer gap resources for the user device 132 may operate to mute (or prevent transmission) of other user devices to the slave cell, so as to thereby prevent interference at the slave cell from one or more other user devices with the user device 132 that is transmitting to multiple cells (including to the slave cell) via the UL resources 340.

According to an example implementation, after the handover of the user device 132 has been performed to the target cell 136 (or after the user device 132 obtains the timing advance for the target cell 136, either through random access procedure or without a random access procedure), the target cell 136 is now operating as the master cell (e.g., UL data transmissions from the user device 132 are transmitted based on the timing advance for the target cell 136) and the source cell 156 is operating as a slave cell (where the source cell 156 may then reserve the buffer gap resources). Thus, the master/slave roles may change over time, e.g., depending on which timing advance the user device 132 has or is using for UL transmission to the multiple cells. The changing criteria can also be based on other aspects for example load situation. For example the cell with more free capacity acts as slave cell. Rather than master cell and slave cell, the terms first cell and second cell may also be used. Thus, regardless of terminology, a single UL data transmission from a user device to multiple cells may be transmitted with a single timing advance, and thus such data transmission will satisfy the timing advance for only one of the multiple cells (e.g., for the master cell). The other (e.g., slave) cells may reserve buffer gap resources on adjacent (in time) resources to mute the other user devices to avoid interference at the slave cell (based on the mis-matched/incorrect timing advance used for the UL data transmission as perceived by the slave cell).

Referring again to FIG. 2, source cell 156/BS 154 and target cell 136/BS 134 may transmit control signals (e.g., reference signals, pilot signals) 210 and 240, respectively, to the user device 132. According to an example implementation, the user device 132 may measure the difference in the propagation delay of these two signals. In an example implementation, based on this measurement difference, the user device may transmit/send a distance/propagation delay/timing advance difference information 222 to the source cell 156 (e.g., with source cell 156 operating as the master cell prior to handover), which may indicate the difference in the distance or the difference in the propagation delay between the source cell-user device link and the target cell-user device link. This difference information 222 may be used by the cells, e.g., the master cell (such as the source cell 156 prior to handover, and the target cell 136 after handover), to determine the buffer gap resources or the quantity of buffer gap resources that may be reserved by the slave cell (such as the target cell 136 before handover, and the source cell 156 after handover). Alternatively, the master cell may forward this difference information to the slave cell, and the slave cell may determine the buffer gap resources. The source cell 156 (acting as the master cell prior to handover) may send buffer gap information 226 to the target cell (operating as the slave cell prior to handover). Thus, the master cell may, for example, determine the buffer gap resources, or the quantity of buffer gap resources, e.g., based on information that may be provided by the user device. The source cell 156 (operating as the master cell) may send an indication of the buffer gap resources for the slave cell to the target cell 136 (operating as a slave cell before handover). The target cell/slave cell may then reserve these buffer gap resources, and then send a response 230 indicating that the buffer gap resources have been reserved/allocated.

According to an example implementation, the buffer gap information 226 (which the slave cell may use to determine buffer gap resources) may include one or more of the following, by way of illustrative example: a buffer gap resource information, received from the master cell, indicating one or more resources or a quantity of resources to be used for the set of buffer gap resources; a timing advance difference estimation received from the master cell, the timing advance difference estimation indicating a difference between a first timing advance for the user device with respect to the master cell and a second timing advance for the user device with respect to the slave cell; a propagation delay difference estimation received from the master cell, the propagation delay difference estimation indicating a difference between the first propagation delay between the user device and the master cell and the second propagation delay between the user device and the slave cell; and an estimate of a difference between a first distance between the user device and the master cell and a second distance between the user device and the slave cell.

Also, referring to FIG. 2, one of the cells (e.g., the master cell) may provide power control information to the user device 132 so as to control the power of the UL transmission that is transmitted by the user device 132 to both the master cell (e.g., source cell 156 before handover) and the slave cell(s) (e.g., target cell 136 before handover). For example, the user device 132 may measure SINR or signal power or other signal parameter of signals (e.g., reference signals) received from each of the source cell (or the master cell) and the target cell (or the slave cell, before handover). The user device 132 may send (e.g., via a measurement report 224) the SINR or other signal parameter of the source (or master) cell signals and target (or slave) cell signals to the source (or master) cell 156 (or master cell). Or, target cell may also receive a measurement report of such SINR/signal parameter from the user device 132 that reports the SINR of the signals transmitted by the target cell/slave cell and received by user device 132, and then the target cell/slave cell may forward the SINR measurement of the target cell/slave cell to the source cell/master cell. Based on the measurement report(s), the source cell (or master cell) may determine a power control information based on the weakest link (e.g., lowest SINR). The power control information may include a power control command and/or may include the SINR or other signal parameter of the weakest link or other information. The master cell (which in this example is the source cell 156 before handover) may then send the power control information to the user device 132. The user device 132 may use the power control information to adjust the transmission power to transmit data to both the source cell and the target cell (the master cell and the slave cell) based on the weakest link, e.g., such that this UL data transmission to multiple cells will have sufficient power to reach the farthest cell/BS of the group of multiple cells.

Figure 4:
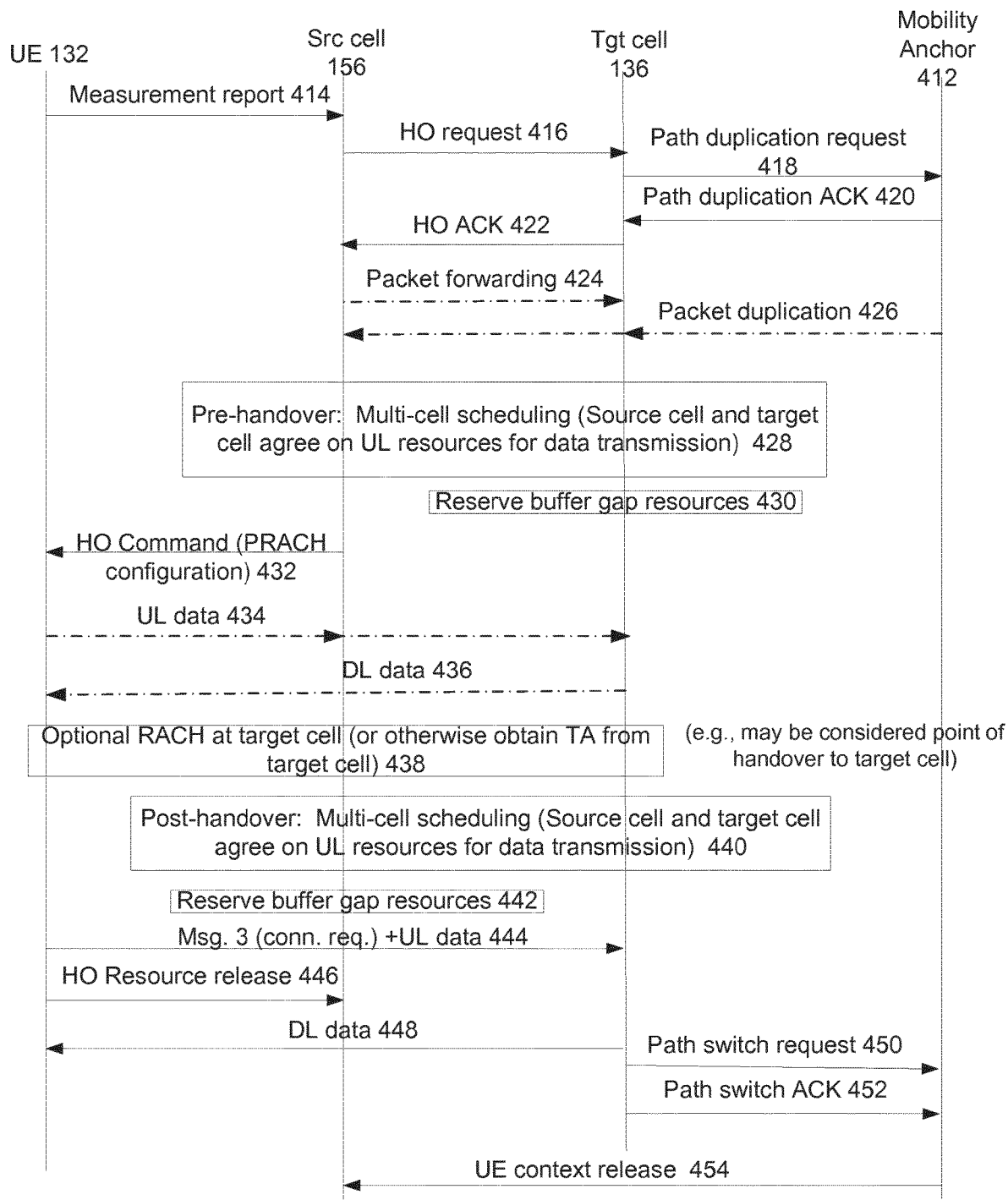
FIG. 4 is a diagram illustrating a handover of a user device according to an example implementation.

FIG. 4 is a diagram illustrating a handover of a user device according to an example implementation. A user device (UE) 132 is in communication with a source cell 156 and a target cell 136. A mobility anchor 412 (part of the core network) is also shown. Although not shown in FIG. 4, the UE 132 may obtain (or determine) the timing advance for the source cell 156, e.g., either through a random access (RACH) procedure with the source cell 156, or via a RACH-less procedure (without using random access). Thus, the UE 132 may determine the timing advance for the source cell 156, e.g., by receiving such timing advance from the master cell 156 or via another technique, such as a RACH-less technique. By obtaining/determining the timing advance for the source cell 156, this may allow the UE 132 to transmit data uplink to the source cell 156, for example.

At 414, the UE 132 may send a measurement report to the source cell, e.g., indicating a handover to the target cell 136. As noted, UE 132 may have selected or prioritized target cell 136 for handover, e.g., based on the target cell being of the same cell type as the source cell 156. At 416, source cell 156 sends a handover request to target cell 136. At 418, target cell sends a path duplication request to the mobility anchor 412, e.g., requesting that duplicate data paths be established to/from the UE 132, for source cell 156 and target cell 136. At 422, target cell 136 send a handover acknowledgement to source cell 156, acknowledging that a handover of UE 132 will be performed to target cell 136. This also may confirm that multi-cell communication (communications performed via both source cell 156 and target cell 136) may be performed for UL and/or DL communications with the UE 132. At 424, packets are forwarded from source cell 156 to target cell 136. At 426, downlink data are forwarded from mobility anchor to both the source cell 156 and the target cell 136, e.g., based on the path duplication.

At 428, (pre-handover, e.g., handover not yet completed) the source cell 156 and the target cell 136 may perform multi-cell scheduling of resources for the UL data transmission from the UE 132. For example, the source cell 156 and target cell 136 may negotiate the UL resources 340 (e.g., FIG. 3) that will be used by the UE 132 to transmit data to both the source cell 156 and target cell 136. In this example, prior to handover (or prior to UE 132 obtaining the timing advance of the target cell 136), the source cell is the master cell.

At 430, the target cell (as a slave cell) may reserve buffer gap resources (e.g., buffer gap resources 330 and/or 350). For example, the slave cell may reserve both lower buffer gap resources 330 and upper buffer gap resources 350. Or, if it is known (by either the master cell or the slave cell) that the distance/propagation delay of the slave cell (e.g., target cell 136) is less than or greater than the distance/propagation delay of the master cell, with respect to the UE 132, then the slave cell may reserve only one of the lower buffer gap resources 330 or upper buffer gap resources 350, as needed by the slave cell. The source cell 156 (as master cell) and/or the target cell 136 (as slave cell) may determine the buffer gap resources, e.g., based on buffer gap information 226 (FIG. 2), for example.

In another example implementation, fixed or predetermined values of the amount of buffer gap resources may be used by the slave cell, where the amount of buffer gap resources to be reserved by the slave cell may be predefined, or established by the core network, etc., based on one or more of the following, by way of example: a fixed amount of buffer gap resources for each pair of cells, e.g., amount_1 is allocated for cell 1 and cell 2; or a fixed amount of buffer gap resources for a pair of cells that are the same or different cell type, e.g., amount_2 of buffer gap resources are reserved when a source cell is a first cell type (e.g., micro cell) and the target cell is a second cell type (e.g., macro cell). Thus, for example, a different or predefined amount of buffer gap resources may be reserved for cells of specific types.

At 432, source cell 156 sends a handover command to UE 132. At 434, the UE 132 transmits a block of data (via single transmission) to both the source cell 156 and the target cell 136 via the UL resources 340 reserved for UL transmission by both source cell 156 and target cell 136. In addition, from the perspective of the target (e.g., slave) cell 136, the UL data transmitted from the UE 132 may also be transmitted via at least a portion of the buffer gap resources (e.g., 330 and/or 350) to the target cell 136.

At 438, the UE 132 may obtain the timing advance for the target cell 136, e.g., either through a random access procedure (RACH), or through a RACH-less procedure where a timing advance is determined by the UE 132 without performing a random access procedure. According to an illustrative example implementation, after the UE 132 has obtained the timing advance with respect to the target cell, it may be considered that a handover of UE 132 has been performed from the source cell 156 to the target cell 136 (at least for purposes of master/slave determination for data transmission). Although different points may be considered as a handover point from source cell to target cell. For example, at this point, the timing advance that the UE just received with respect to the target cell may be more recent/accurate as compared to a previously obtained timing advance with respect to the source cell 156. The target cell 136 may also notify the source cell 156 that the target cell 136 is now master cell with respect to UE 132. And thus, source cell 156 is now a slave cell with respect to UE 132, and slave cell will need to reserve buffer gap resources for any UL data transmissions from UE 132 to multiple cells.

At 440, source cell 156 (now as a slave cell) and target cell (now as the master cell) may perform multi-cell scheduling for UL data transmission from the UE 132, by agreeing on UL resources 340 (although typically different time-frequency UL resources that were agreed upon at 428 and used by UE 132at 434) to be used by UE 132 to perform post-handover UL data transmission to both the target cell 136 and the source cell 156 (via a single transmission). At 442, the target cell 136 (as a slave cell) may reserve buffer gap resources for an UL transmission from UE 132. At 444, the UE 132 may send a connection request to target cell to establish a connection to target cell 136. Also, at 444, the UE 132 may transmit data (as a single data transmission) to both target cell 136 and source cell 156 via the UL resources 340 reserved by both source cell 156 and target cell 136. Also, from the perspective of the source cell 156 (as a slave cell), the UL data transmission may also be transmitted (or received by source cell 156) via at least a portion of the buffer gap resources reserved by the source cell 156.

At 446, the UE 132 sends a handover resource release to source cell 156. At 448, the target cell (and possibly also the source cell) sends DL data to UE 132. At 450 and 452, a path switch request and path switch acknowledgement are transmitted, so as to release the duplicate path and/or provide only the path via the target cell 136. At 453, the mobility anchor 412 may send a UE context release to source cell 156 so that source cell 156 may release the context associated with UE 132.

As shown in FIG. 4, communications reliability, including handover reliability, may be improved for at least a period of time before and/or after a handover by allowing a UE 132 to perform UL data transmission, via a single transmission, to both source cell 156 and master cell 136, where one of the cells (e.g., the slave cell) may reserve buffer gap resources, e.g., to accommodate the UL data transmission sent based on a timing advance for the other (e.g., master) cell.

The process described above with respect to FIG. 4 may include a number of features and/or advantages, such as, for example:

Path duplication operation: instead of keeping one data path with mobility anchor, during handover (HO), there can be two parallel connections with the mobility anchor 412 or core network, or a bi-cast link may be established between mobility anchor 412 and source and target cells.

Joint multi-cell scheduling for reliable HO: the process where the two cells agree on the resource to be used in UL and/or DL direction towards UE to support multi-connectivity. According to an example implementation, multi-connectivity (or multi-cell communication) may mean or may include, for example, that: 1) in DL, more than one cell will transmit the same data packet to UE; and/or 2) in UL, the both source cell 156 and target cell 136 receive the same data packet from the UE with one UL transmission only, for example. According to an example implementation, one UL transmission may be sent and received at both the source cell 156 and target cell 136. Since a timing advance (TA) (e.g., timing advance offset) from the target cell 136 is not available yet before the possible random access (RA) procedure (or before other TA acquisition technique), the target cell 136 will allocate more time domain resources to avoid UL interference between UE 132 and other UEs in communication with slave cell (target cell before handover). The buffer gap resource allocation at target (slave) cell 136 may depend on the signal propagation delay with certain time-offset between master and slave cell, e.g. earlier or later than time of arrival to master cell. In order to achieve this, resources at the target (slave) cell 136 should be the sum of the UL resources (e.g., 340) allocated by the source (master) cell 156 and the buffer gap resource 330/350 as shown in FIG. 3. The benefit of both cells using the same time-frequency resources to receive the UL data is that from UE point of view there is no need to transmit twice the same data. That is to say, with one transmission, the same data can be received at both source cell 156 and target cell 136. In this way, UE 132 does not need to have multiple transmit (TX) chains to support reliable HO and possible additional latency. The received UL data can be combined at either the source cell 156, target cell 136 or even mobility anchor 412 depending on the operation mode. In FIG. 3, the cell from which UE 132 obtains a correct (e.g., most recent or most accurate) TA command is referred as a master cell, and the other cell(s) as slave cell(s). For example, before RACH (random access or other technique to acquire the TA for the target cell) at target cell 136, source cell 156 can be the master cell. According to an example implementation, after UE 132 obtains TA from target cell 136, the target cell 136 becomes the master cell.

HO resource release: According to an illustrative example implementation, after UE 132 obtains or receives sufficient service at the target cell 136, the resources at source cell 156 may be released. In this way, the HO failure performance can be improved. Some additional features or considerations are described below.

Size of the buffer gap resources: According to an example implementation, the size of the buffer gap resources may depend on the distance difference (e.g., between the UE-source cell distance and UE-target cell distance). For example, a longer/longest buffer gap resources may be needed in case one of the cells are macro (e.g., large) cell and the other cell is a pico (or small) cell. According to one way to calculate the needed guard time (in number of OFDM symbols) is:

Ceiling(distance difference/c/symbol length). Since the distance difference is not always known, the simple but not accurate way is: Ceiling(coverage difference/C/symbol length) where C is the light speed. Coverage may be the UE-cell distance for a cell, and the difference may be the difference between the UE-cell distance for the master and slave cell. Coverage difference/C may be the delta propagation delay (that is the difference in propagation delay between the master cell and slave cell, with respect to the UE. In this manner, a length (or amount) of buffer gap resources may be determined.

Buffer gap information estimation and delivery: Based on the information from both source cell and target cell for example synchronization channel, common pilot symbol etc., the UE can roughly estimate the difference between TA_master and TA_slave. It should be noted only TA_master (timing advance with respect to the master cell) is available and TA_slave (timing advance with respect to slave cell) is not available to UE. Such difference should be reported back first to master cell via measurement report. Then master cell will inform such information to slave cell, and based on this information, slave cell will know how many symbols the buffer gap should be.

In another example implementation of buffer gap estimation and delivery, the extended UCI (uplink control information) format is used to deliver the estimated TA difference to both master and slave cells (that is, there is only one uplink transmission). Slave cell may receive the TA difference estimated by UE and depending on the estimated absolute TA difference and sign (advance/delayed with regards to master), the buffer gap resources are allocated at slave cell. Since master cell will also receive this information, the knowledge of the TA difference can be used to assist the UE uplink transmission to slave cell by controlling the uplink scheduling and other uplink transmission parameters.

Transmission power setting for reliable communication: In an example implementation, the UL TX power of UE can be set according to the lower SINR (signal to interference plus noise ratio) link (e.g., macro link in case one of the cells are small cell). With the assumption that master cell is taking care of TX power setting, SINR target is set at master cell but SINR target is set according to the link quality at both master cell and target cell. Master cell informs slave cell about the targeted SINR.

Target cell selection for HO: to better facilitate multi-connectivity operation, a new criterion of selecting target cell may be used: the source cell coverage or type. For example: high priority is given to the cell with similar coverage status as source cell, or similar type as source cell. The cell type can be characterized as pico, micro, macro, small, etc. To be more specific, for example, in case the source cell is a small cell, it may be advantageous to select another small cell as target cell for handover if possible. Only in case no possibility to select small cell (e.g., same cell type as source cell) as target cell, macro cell is selected as the target cell and TA difference for buffer gap allocation is compensated with the estimated difference in terms of cell size or type. On the other hand, if the source cell is with macro coverage, better to select another macro cell as target.

Hybrid ARQ (automatic repeat request) operation: In UL, UE can send ACK/NACK (acknowledgement/negative acknowledgement) based on the combined signals from both cells. For example, if UE receives a packet from a source cell but fails to receive the same packet from the target cell, the UE may typically send an ACK for that packet, since it was successfully by the UE. In DL, joint ACK/NACK based on the combined signals from both source cell and target cell should be sent to UE. Depending on the implementation options, combining can be done at transport block (TB) level or one of many selections at packet level (based on transport block CRC or frame quality estimate).

Flexible UL/DL TDD: For small cell deployments where signals experience small delay spread, it is possible to use TDD based radio access where the transmit resources are flexibly assigned to uplink and downlink in each frame without any switching point restrictions so that any slot can be used either uplink or downlink. Flexible TDD switching between uplink and downlink can lead to severe UL/DL-interference. In this case the source and target cell needs to allocate the same TDD subframe for uplink communication by coordinating the uplink scheduling and assigning the particular frame for UL only. Another option is to use UE based uplink control information source/target cell. Thus, if an UL transmission will be performed from UE to first cell and a second cell, then both first cell and second cell should each have a subframe configuration where UL data can be sent to both cells for that subframe. Thus, the subframe configurations may be coordinated among the multiple cells, so that both cells can receive the UL data during the reserved UL resourced 340.

Therefore, a number of example advantages may be achieved via one or more of the example implementations, such as, for example:

Multi-connectivity/multi-cell communications during HO to increase reliability and reduce HO failure.

Various techniques may be used (but not limited to) during the handover, thus the signaling load between the source and target base stations/cells may be significantly lower.

U-Plane zero (or at least very low) latency HO: reduced handover latency for the user/data plane.

One UL transmission of data to multiple cells, thereby providing a more efficient use of resources/spectra Also, at least in some cases, for intra-frequency deployments in heterogeneous networks, it is possible to remove the heavy interference during handovers. In fact, the interference becomes a useful signal at target slave cell. This is especially useful during outbound handovers from small cells, where the probability of a handover failure is high.

Figure 5:
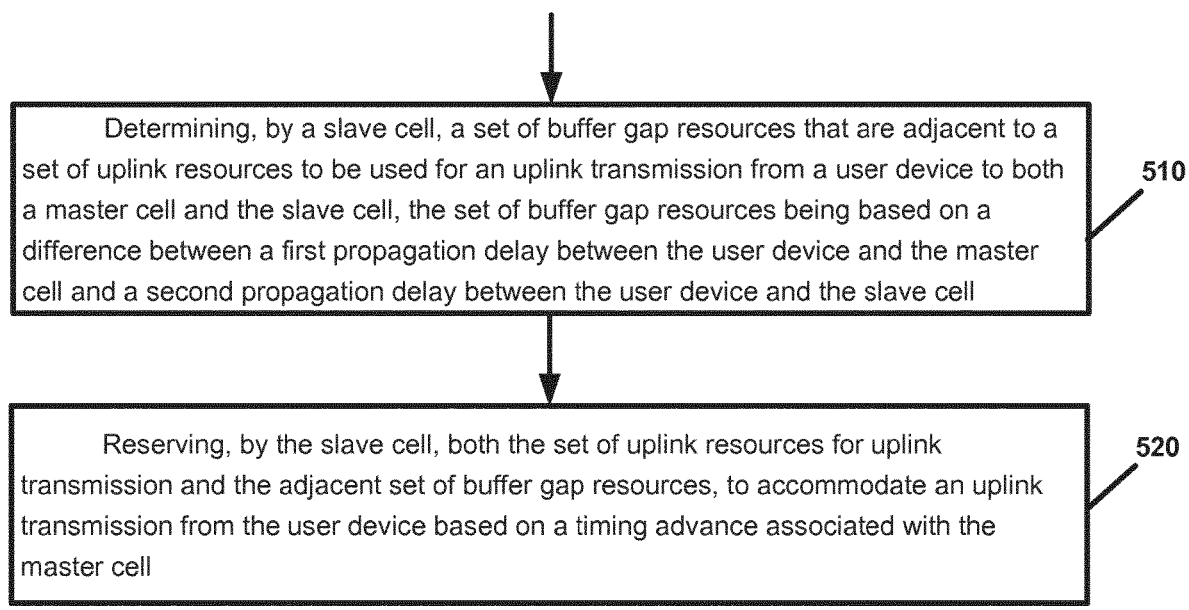
FIG. 5 is a flow chart illustrating operation of a slave cell according to an example implementation.

FIG. 5 is a flow chart illustrating operation of a slave cell according to an example implementation. Operation 510 includes determining, by a slave cell, a set of buffer gap resources that are adjacent to the set of uplink resources to be used for an uplink transmission from a user device to both a master cell and a slave cell, the set of buffer gap resources being based on a difference between a first propagation delay between the user device and the master cell and a second propagation delay between the user device and the slave cell. And, operation 520 includes reserving, by the slave cell, both the set of uplink resources for uplink transmission and the adjacent set of buffer gap resources, to accommodate an uplink transmission from the user device based on a timing advance associated with the master cell.

According to an example implementation of the method of FIG. 5, the method may further include receiving, by the slave cell via at least a portion of the set of uplink resources and at least a portion of the buffer gap resources, an uplink transmission from the user device that is transmitted based on the timing advance associated with the master cell.

According to an example implementation of the method of FIG. 5, the method further including determining a set of uplink resources to be used for an uplink transmission, including performing at least one of the following: negotiating, by the slave cell, the set of uplink resources with the master cell; and receiving, by the slave cell from the master cell, an indication of the set of uplink resources.

According to an example implementation of the method of FIG. 5, the buffer gap resources may include at least one of the following: a set of lower buffer gap time-frequency resources provided immediately before the set of uplink resources; and a set of upper buffer gap time-frequency resources provided immediately after the set of uplink resources.

According to an example implementation of the method of FIG. 5, the uplink resources and the set of buffer gap resources each include one or more orthogonal frequency division multiplex (OFDM) symbols.

According to an example implementation of the method of FIG. 5, wherein prior to a handover of the user device from a source cell to a target cell, the source cell is the master cell and the target cell is the slave cell; and wherein after a handover of the user device from the source cell to the target cell, the target cell is the master cell and the source cell is the slave cell.

According to an example implementation of the method of FIG. 5, wherein prior to the user device receiving a timing advance for the target cell, the source cell is the master cell and the target cell is the slave cell; and wherein after the user device receiving a timing advance for the target cell, the target cell is the master cell and the source cell is the slave cell.

According to an example implementation of the method of FIG. 5, wherein the slave cell determines a size of the set of buffer gap resources based on at least one of the following: a buffer gap resource information, received from the master cell, indicating one or more resources or a quantity of resources to be used for the set of buffer gap resources; a timing advance difference estimation received from the master cell, the timing advance difference estimation indicating a difference between a first timing advance for the user device with respect to the master cell and a second timing advance for the user device with respect to the slave cell; a propagation delay difference estimation received from the master cell, the propagation delay difference estimation indicating a difference between the first propagation delay between the user device and the master cell and the second propagation delay between the user device and the slave cell; and an estimate of a difference between a first distance between the user device and the master cell and a second distance between the user device and the slave cell.

According to another example implementation, an apparatus includes at least one processor and at least one memory including computer instructions, when executed by the at least one processor, cause the apparatus to: determine a set of uplink resources to be used for an uplink transmission from a user device to both a master cell and a slave cell; determine, by the slave cell, a set of buffer gap resources that are adjacent to the set of uplink resources, the set of buffer gap resources being based on a difference between a first propagation delay between the user device and the master cell and a second propagation delay between the user device and the slave cell; and reserve, by the slave cell for the user device, both the set of uplink resources for uplink transmission and the adjacent set of buffer gap resources, to accommodate an uplink transmission from the user device based on a timing advance associated with the master cell.

According to an example implementation of the apparatus, and further causing the apparatus to: receive, by the slave cell via at least a portion of the set of uplink resources and at least a portion of the buffer gap resources, an uplink transmission from the user device that is transmitted based on the timing advance associated with the master cell.

According to an example implementation of the apparatus, wherein the buffer gap resources include at least one of the following: a set of lower buffer gap time-frequency resources provided immediately before the set of uplink resources; and a set of upper buffer gap time-frequency resources provided immediately after the set of uplink resources.

According to an example implementation, an apparatus includes: means (e.g., 510 of FIG. 5, 802A/802B and/or 804, FIG. 8) for determining a set of uplink resources to be used for an uplink transmission from a user device to both a master cell and a slave cell; means (e.g., 520 of FIG. 5, 802A/802B and/or 804, FIG. 8) for determining, by the slave cell, a set of buffer gap resources that are adjacent to the set of uplink resources, the set of buffer gap resources being based on a difference between a first propagation delay between the user device and the master cell and a second propagation delay between the user device and the slave cell; and means (e.g., 530 of FIG. 5, 802A/802B and/or 804, FIG. 8) for reserving, by the slave cell, both the set of uplink resources for uplink transmission and the adjacent set of buffer gap resources, to accommodate an uplink transmission from the user device based on a timing advance associated with the master cell.

According to an example implementation of the apparatus, the apparatus may further include means (e.g., 802A/802B and/or 804, FIG. 8) for receiving, by the slave cell via at least a portion of the set of uplink resources and at least a portion of the buffer gap resources, an uplink transmission from the user device that is transmitted based on the timing advance associated with the master cell.

According to an example implementation of the apparatus, the apparatus further including means for determining a set of uplink resources to be used for an uplink transmission, including at least one of the following: means (e.g., 802A/802B and/or 804, FIG. 8) for negotiating, by the slave cell, the set of uplink resources with the master cell; and means (e.g., 802A/802B and/or 804, FIG. 8) for receiving, by the slave cell from the master cell, an indication of the set of uplink resources.

According to an example implementation of the apparatus, the buffer gap resources may include at least one of the following: a set of lower buffer gap time-frequency resources provided immediately before the set of uplink resources; and a set of upper buffer gap time-frequency resources provided immediately after the set of uplink resources.

According to an example implementation of the apparatus, the uplink resources and the set of buffer gap resources each include one or more orthogonal frequency division multiplex (OFDM) symbols.

According to an example implementation of the apparatus, wherein prior to a handover of the user device from a source cell to a target cell, the source cell is the master cell and the target cell is the slave cell; and wherein after a handover of the user device from the source cell to the target cell, the target cell is the master cell and the source cell is the slave cell.

According to an example implementation of the apparatus, wherein prior to the user device receiving a timing advance for the target cell, the source cell is the master cell and the target cell is the slave cell; and wherein after the user device receiving a timing advance for the target cell, the target cell is the master cell and the source cell is the slave cell.

According to an example implementation of the apparatus, wherein the slave cell determines a size of the set of buffer gap resources based on at least one of the following: a buffer gap resource information, received from the master cell, indicating one or more resources or a quantity of resources to be used for the set of buffer gap resources; a timing advance difference estimation received from the master cell, the timing advance difference estimation indicating a difference between a first timing advance for the user device with respect to the master cell and a second timing advance for the user device with respect to the slave cell; a propagation delay difference estimation received from the master cell, the propagation delay difference estimation indicating a difference between the first propagation delay between the user device and the master cell and the second propagation delay between the user device and the slave cell; and an estimate of a difference between a first distance between the user device and the master cell and a second distance between the user device and the slave cell.

Figure 6:
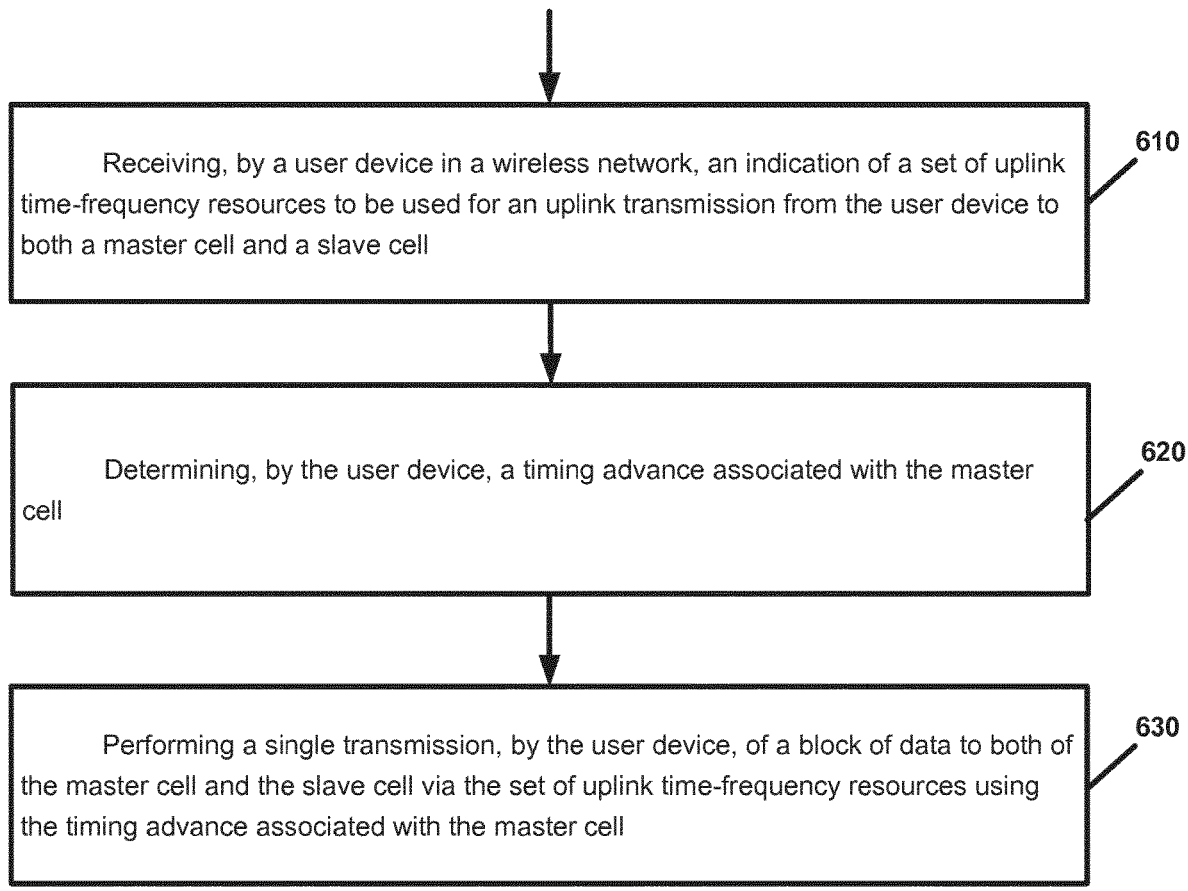
FIG. 6 is a flow chart illustrating operation of a user device according to an example implementation.

FIG. 6 is a flow chart illustrating operation of a user device according to an example implementation. Operation 610 includes receiving, by a user device in a wireless network, an indication of a set of uplink time-frequency resources to be used for an uplink transmission from the user device to both a master cell and a slave cell. Operation 620 includes determining, by the user device, a timing advance associated with the master cell. Operation 630 includes performing a single transmission, by the user device, of a block of data to both of the master cell and the slave cell via the set of uplink time-frequency resources using the timing advance associated with the master cell.

According to an example implementation of the method of FIG. 6, the performing may include performing a single transmission by the user device, using the timing advance associated with the master cell of a block of data, to both of the master cell and the slave cell via at least a portion of the set of uplink time-frequency resources reserved by both the master cell and the slave cell and at least a portion of a set of buffer gap resources reserved by only the slave cell based on a difference in a propagation delay between the user device-master cell wireless link and a user device-slave cell wireless link.

According to an example implementation of the method of FIG. 6, and further including: performing, by the user device, power control to adjust a transmission power of the user device used to perform the transmission to both the master cell and the slave cell based on information received from only one of the master cell and the slave cell.

According to an example implementation of the method of FIG. 6, the method further including performing, by the user device, power control to adjust a transmission power of the user device used to perform the transmission to both the master cell and the slave cell based on information received from only the master cell.

According to an example implementation of the method of FIG. 6, the method further including receiving, by the user device, a power control information to adjust a transmission power of the user device used to perform the transmission, wherein the power control information is based on a weakest wireless link between the user device-master cell link and the user device-slave cell link.

According to an example implementation of the method of FIG. 6, the power control information may include at least one of: a power control command indicating a power to be used by the user device to perform transmission to both the master cell and the slave cell; and a signal quality or a signal strength provided for the weakest wireless link.

According to an example implementation of the method of FIG. 6, the method further including performing a handover of the user device from a source cell to a target cell, wherein prior to the handover of the user device the source cell is the master cell and the target cell is the slave cell; and wherein after performing the handover of the user device the target cell is the master cell and the source cell is the slave cell.

According to an example implementation of the method of FIG. 6, the performing a single transmission may include: performing, by the user device prior to the user device determining a timing advance associated with the target cell, a first data transmission to both the source cell and the target cell via a first set of uplink time-frequency resources using a timing advance associated with the source cell; and performing a second single transmission, by the user device after to the handover of the user device, of a second block of data to both the source cell and the target cell via a second set of uplink time-frequency resources using a timing advance associated with the target cell.

According to an example implementation of the method of FIG. 6, the method may further include selecting, by the user device, the slave cell for a handover from the master cell based on a cell type of the slave cell that is a same cell type as the master cell.

According to another example implementation, an apparatus includes at least one processor and at least one memory including computer instructions, when executed by the at least one processor, cause the apparatus to: receive, by a user device in a wireless network, an indication of a set of uplink time-frequency resources to be used for an uplink transmission from the user device to both a master cell and a slave cell; determine, by the user device, a timing advance associated with the master cell; and, perform a single transmission, by the user device, of a block of data to both of the master cell and the slave cell via the set of uplink time-frequency resources using the timing advance associated with the master cell.

According to an example implementation of the apparatus, the causing the apparatus to perform may include causing the apparatus to: perform a single transmission by the user device, using the timing advance associated with the master cell of a block of data, to both of the master cell and the slave cell via at least a portion of the set of uplink time-frequency resources reserved by both the master cell and the slave cell and at least a portion of a set of buffer gap resources reserved by only the slave cell based on a difference in a propagation delay between the user device-master cell wireless link and a user device-slave cell wireless link.

According to an example implementation of the apparatus, and further causing the apparatus to: perform, by the user device, power control to adjust a transmission power of the user device used to perform the transmission to both the master cell and the slave cell based on information received from only one of the master cell and the slave cell.

According to another example implementation, a computer program product includes a computer-readable storage medium and storing executable code that, when executed by at least one data processing apparatus, is configured to cause the at least one data processing apparatus to perform a method including: receiving, by the user device in a wireless network, an indication of a set of uplink time-frequency resources to be used for an uplink transmission from the user device to both a master cell and a slave cell; determining a timing advance associated with the master cell; and, performing a single transmission, by the user device, of a block of data to both of the master cell and the slave cell via the set of uplink time-frequency resources using the timing advance associated with the master cell.

According to another example implementation, an apparatus may include means (e.g., 610, FIG. 6, 802A/802B and/or 804, FIG. 8) for receiving, by a user device in a wireless network, an indication of a set of uplink time-frequency resources to be used for an uplink transmission from the user device to both a master cell and a slave cell; means (e.g., 620, FIG. 6, 802A/802B and/or 804, FIG. 8) for determining, by the user device, a timing advance associated with the master cell; and means (e.g., 630, FIG. 6, 802A/802B and/or 804, FIG. 8) for performing a single transmission, by the user device, of a block of data to both of the master cell and the slave cell via the set of uplink time-frequency resources using the timing advance associated with the master cell.

According to an example implementation of the apparatus, the means for performing may include means (e.g., 802A/802B and/or 804, FIG. 8) for performing a single transmission by the user device, using the timing advance associated with the master cell of a block of data, to both of the master cell and the slave cell via at least a portion of the set of uplink time-frequency resources reserved by both the master cell and the slave cell and at least a portion of a set of buffer gap resources reserved by only the slave cell based on a difference in a propagation delay between the user device-master cell wireless link and a user device-slave cell wireless link.

According to an example implementation of the apparatus, and further including: means (e.g., 802A/802B and/or 804, FIG. 8) for performing, by the user device, power control to adjust a transmission power of the user device used to perform the transmission to both the master cell and the slave cell based on information received from only one of the master cell and the slave cell.

According to an example implementation of the apparatus, the apparatus further including means (e.g., 802A/802B and/or 804, FIG. 8) for performing, by the user device, power control to adjust a transmission power of the user device used to perform the transmission to both the master cell and the slave cell based on information received from only the master cell.

According to an example implementation of the apparatus, the apparatus further including means (e.g., 802A/802B and/or 804, FIG. 8) for receiving, by the user device, a power control information to adjust a transmission power of the user device used to perform the transmission, wherein the power control information is based on a weakest wireless link between the user device-master cell link and the user device-slave cell link.

According to an example implementation of the apparatus, the power control information may include at least one of: a power control command indicating a power to be used by the user device to perform transmission to both the master cell and the slave cell; and a signal quality or a signal strength provided for the weakest wireless link.

According to an example implementation of the apparatus, the apparatus further including means (e.g., 802A/802B and/or 804, FIG. 8) for performing a handover of the user device from a source cell to a target cell, wherein prior to the handover of the user device the source cell is the master cell and the target cell is the slave cell; and wherein after performing the handover of the user device the target cell is the master cell and the source cell is the slave cell.

According to an example implementation of the apparatus, the means for performing a single transmission may include: means (e.g., 802A/802B and/or 804, FIG. 8) for performing, by the user device prior to the user device determining a timing advance associated with the target cell, a first data transmission to both the source cell and the target cell via a first set of uplink time-frequency resources using a timing advance associated with the source cell; and performing a second single transmission, by the user device after to the handover of the user device, of a second block of data to both the source cell and the target cell via a second set of uplink time-frequency resources using a timing advance associated with the target cell.

According to an example implementation of the apparatus, the apparatus may further include means (e.g., 802A/802B and/or 804, FIG. 8) for selecting, by the user device, the slave cell for a handover from the master cell based on a cell type of the slave cell that is a same cell type as the master cell.

Figure 7:
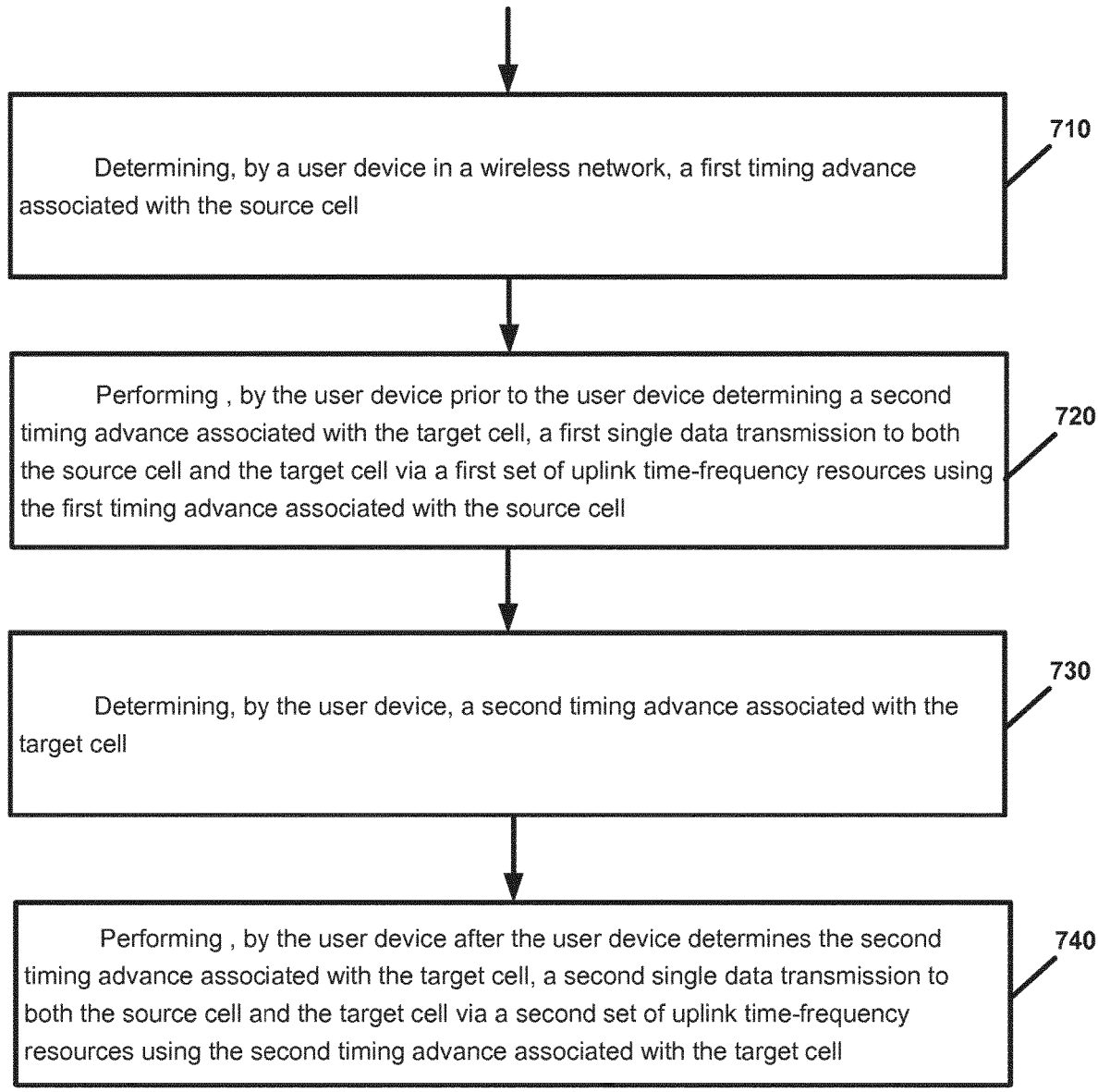
FIG. 7 is a flow chart illustrating operation of a user device according to another example implementation.

FIG. 7 is a flow chart illustrating operation of a user device according to another example implementation. Operation 710 includes determining, by a user device in a wireless network, a first timing advance associated with the source cell. Operation 720 includes performing, by the user device prior to the user device determining a second timing advance associated with the target cell, a first single data transmission to both the source cell and the target cell via a first set of uplink time-frequency resources using the first timing advance associated with the source cell. Operation 730 includes determining, by the user device, a second timing advance associated with the target cell. And, operation 740 includes performing, by the user device after the user device determines the second timing advance associated with the target cell, a second single data transmission to both the source cell and the target cell via a second set of uplink time-frequency resources using the second timing advance associated with the target cell.

According to another example implementation, an apparatus may include at least one processor and at least one memory including computer instructions, when executed by the at least one processor, cause the apparatus to: determine, by a user device in a wireless network, a first timing advance associated with the source cell; perform, by the user device prior to the user device determining a second timing advance associated with the target cell, a first single data transmission to both the source cell and the target cell via a first set of uplink time-frequency resources using the first timing advance associated with the source cell; determine, by the user device, a second timing advance associated with the target cell; and perform, by the user device after the user device determines the second timing advance associated with the target cell, a second single data transmission to both the source cell and the target cell via a second set of uplink time-frequency resources using the second timing advance associated with the target cell.

According to an example implementation, a computer program product includes a computer-readable storage medium and storing executable code that, when executed by at least one data processing apparatus, is configured to cause the at least one data processing apparatus to perform a method including: determining, by a user device in a wireless network, a first timing advance associated with the source cell; performing, by the user device prior to the user device determining a second timing advance associated with the target cell, a first single data transmission to both the source cell and the target cell via a first set of uplink time-frequency resources using the first timing advance associated with the source cell; determining, by the user device, a second timing advance associated with the target cell; and performing, by the user device after the user device determines the second timing advance associated with the target cell, a second single data transmission to both the source cell and the target cell via a second set of uplink time-frequency resources using the second timing advance associated with the target cell.

According to another example implementation, an apparatus may include: means (e.g., 710, FIG. 7, 802A/802B and/or 804, FIG. 8) for determining, by a user device in a wireless network, a first timing advance associated with the source cell; means (e.g., 720, FIG. 7, 802A/802B and/or 804, FIG. 8) for performing, by the user device prior to the user device determining a second timing advance associated with the target cell, a first single data transmission to both the source cell and the target cell via a first set of uplink time-frequency resources using the first timing advance associated with the source cell; means (e.g., 730, FIG. 7, 802A/802B and/or 804, FIG. 8) for determining, by the user device, a second timing advance associated with the target cell; and means (e.g., 740, FIG. 7, 802A/802B and/or 804, FIG. 8) for performing, by the user device after the user device determines the second timing advance associated with the target cell, a second single data transmission to both the source cell and the target cell via a second set of uplink time-frequency resources using the second timing advance associated with the target cell.

Figure 8:
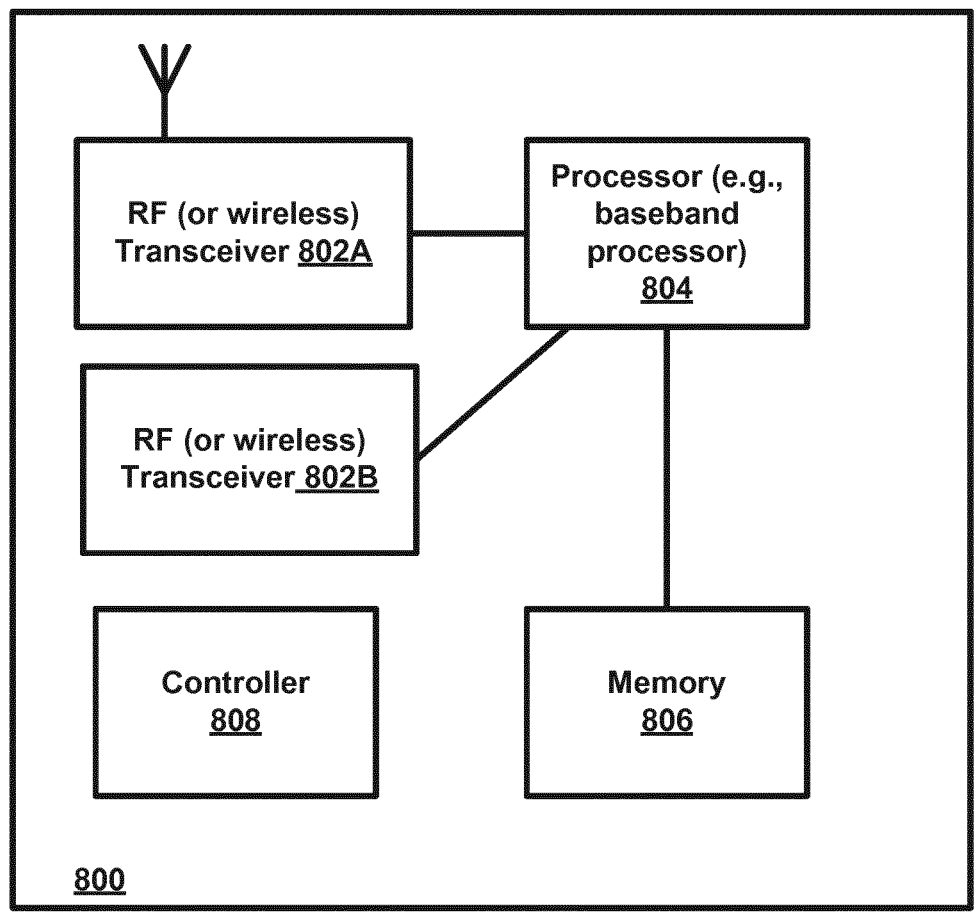
FIG. 8 is a block diagram of a wireless station (e.g., base station/access point or mobile station/user device/user equipment) according to an example implementation.

FIG. 8 is a block diagram of a wireless station (e.g., AP or user device) 800 according to an example implementation. The wireless station 800 may include, for example, one or two RF (radio frequency) or wireless transceivers 802A, 802B, where each wireless transceiver includes a transmitter to transmit signals and a receiver to receive signals. The wireless station also includes a processor or control unit/entity (controller) 804 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
determining, by a slave cell, a set of buffer gap resources that are adjacent to a set of uplink resources to be used for an uplink transmission from a user device to both a master cell and the slave cell, the set of buffer gap resources being based on a difference between a first propagation delay between the user device and the master cell and a second propagation delay between the user device and the slave cell; and
reserving, by the slave cell, both the set of uplink resources for uplink transmission and the adjacent set of buffer gap resources, to accommodate an uplink transmission from the user device based on a timing advance associated with the master cell.

2. The method of claim 1 and further comprising:
receiving, by the slave cell via at least a portion of the set of uplink resources and at least a portion of the buffer gap resources, an uplink transmission from the user device that is transmitted based on the timing advance associated with the master cell.

3. The method of claim 1, wherein the method further comprises:
determining, by the slave cell, the set of uplink resources to be used for an uplink transmission, including performing at least one of the following:
negotiating, by the slave cell, the set of uplink resources with the master cell; and
receiving, by the slave cell from the master cell, an indication of the set of uplink resources.

4. The method of claim 1, wherein the buffer gap resources comprises at least one of the following:
a set of lower buffer gap time-frequency resources provided immediately before the set of uplink resources; and
a set of upper buffer gap time-frequency resources provided immediately after the set of uplink resources.

5. The method of claim 1:
wherein prior to a handover of the user device from a source cell to a target cell, the source cell is the master cell and the target cell is the slave cell;
wherein after a handover of the user device from the source cell to the target cell, the target cell is the master cell and the source cell is the slave cell;
wherein prior to the user device receiving a timing advance for the target cell, the source cell is the master cell and the target cell is the slave cell; and
wherein after the user device receiving a timing advance for the target cell, the target cell is the master cell and the source cell is the slave cell.

6. The method of claim 1 wherein the slave cell determines a size of the set of buffer gap resources based on at least one of the following:
a buffer gap resource information, received from the master cell, indicating one or more resources or a quantity of resources to be used for the set of buffer gap resources;
a timing advance difference estimation received from the master cell, the timing advance difference estimation indicating a difference between a first timing advance for the user device with respect to the master cell and a second timing advance for the user device with respect to the slave cell;
a propagation delay difference estimation received from the master cell, the propagation delay difference estimation indicating a difference between the first propagation delay between the user device and the master cell and the second propagation delay between the user device and the slave cell; and
an estimate of a difference between a first distance between the user device and the master cell and a second distance between the user device and the slave cell.

7. A method comprising:
receiving, by a user device in a wireless network, an indication of a set of uplink time-frequency resources to be used for an uplink transmission from the user device to both a master cell and a slave cell;
determining, by the user device, a timing advance associated with the master cell;
performing a single transmission, by the user device, of a block of data to both of the master cell and the slave cell via the set of uplink time-frequency resources using the timing advance associated with the master cell.

8. The method of claim 7 wherein the performing comprises:
performing a single transmission by the user device, using the timing advance associated with the master cell of a block of data, to both of the master cell and the slave cell via at least a portion of the set of uplink time-frequency resources reserved by both the master cell and the slave cell and at least a portion of a set of buffer gap resources reserved by only the slave cell based on a difference in a propagation delay between the user device-master cell wireless link and a user device-slave cell wireless link.

9. The method of claim 7 wherein the method further comprises at least one of:
performing, by the user device, power control to adjust a transmission power of the user device used to perform the transmission to both the master cell and the slave cell based on information received from only one of the master cell and the slave cell; and
performing, by the user device, power control to adjust a transmission power of the user device used to perform the transmission to both the master cell and the slave cell based on information received from only the master cell.

10. The method of claim 7 wherein the method further comprises:
receiving, by the user device, a power control information to adjust a transmission power of the user device used to perform the transmission, wherein the power control information is based on a weakest wireless link between the user device-master cell link and the user device-slave cell link.

11. The method of claim 7 wherein the power control information comprises at least one of:
a power control command indicating a power to be used by the user device to perform transmission to both the master cell and the slave cell; and
a signal quality or a signal strength provided for the weakest wireless link.

12. The method of claim 7, and further comprising:
performing a handover of the user device from a source cell to a target cell;
wherein prior to the handover of the user device the source cell is the master cell and the target cell is the slave cell; and
wherein after performing the handover of the user device the target cell is the master cell and the source cell is the slave cell.

13. The method of claim 7 wherein the performing a single transmission comprises:
performing, by the user device prior to the user device determining a timing advance associated with the target cell, a first data transmission to both the source cell and the target cell via a first set of uplink time-frequency resources using a timing advance associated with the source cell; and
performing a second single transmission, by the user device after to the handover of the user device, of a second block of data to both the source cell and the target cell via a second set of uplink time-frequency resources using a timing advance associated with the target cell.

14. The method of claim 7 and further comprising:
selecting, by the user device, the slave cell for a handover from the master cell based on a cell type of the slave cell that is a same cell type as the master cell.

15. The method of claim 7 wherein the determining comprises:
receiving, by the user device, a timing advance associated with the master cell.

16. An apparatus comprising at least one processor and at least one memory including computer instructions, when executed by the at least one processor, cause the apparatus to:
receive, by a user device in a wireless network, an indication of a set of uplink time-frequency resources to be used for an uplink transmission from the user device to both a master cell and a slave cell;
determine, by the user device, a timing advance associated with the master cell;
perform a single transmission, by the user device, of a block of data to both of the master cell and the slave cell via the set of uplink time-frequency resources using the timing advance associated with the master cell.

17. The apparatus of claim 16 wherein causing the apparatus to perform comprises causing the apparatus to:

perform a single transmission by the user device, using the timing advance associated with the master cell of a block of data, to both of the master cell and the slave cell via at least a portion of the set of uplink time-frequency resources reserved by both the master cell and the slave cell and at least a portion of a set of buffer gap resources reserved by only the slave cell based on a difference in a propagation delay between the user device-master cell wireless link and a user device-slave cell wireless link.

18. The apparatus of claim 16 and further causing the apparatus to:
perform, by the user device, power control to adjust a transmission power of the user device used to perform the transmission to both the master cell and the slave cell based on information received from only one of the master cell and the slave cell.

19. A computer program product, the computer program product comprising a computer-readable storage medium and storing executable code that, when executed by at least one data processing apparatus, is configured to cause the at least one data processing apparatus to perform the method of claim 1.

20. A computer program product, the computer program product comprising a computer-readable storage medium and storing executable code that, when executed by at least one data processing apparatus, is configured to cause the at least one data processing apparatus to perform the method of claim 7.

* * * * *